(12) United States Patent
Shibata

(10) Patent No.: US 6,721,326 B1
(45) Date of Patent: Apr. 13, 2004

(54) CELL MULTIPLEXING SYSTEM AND METHOD FOR AN ATM NETWORK

(75) Inventor: Kenji Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/524,321

(22) Filed: Mar. 13, 2000

(30) Foreign Application Priority Data

May 31, 1999 (JP) .......................................... 11-153011

(51) Int. Cl.$^7$ ............................................. H04L 12/28
(52) U.S. Cl. ................................ 370/395.6; 370/395.61
(58) Field of Search .......................... 370/395.1, 395.2, 370/395.3, 395.42, 395.6, 395.61, 474, 476

(56) References Cited

U.S. PATENT DOCUMENTS

| | | | |
|---|---|---|---|
| 5,742,610 A | * | 4/1998 | Natarajan .................... 370/476 |
| 5,802,051 A | * | 9/1998 | Petersen et al. ........ 370/395.42 |
| 5,822,321 A | * | 10/1998 | Petersen et al. ............ 370/474 |
| 5,946,309 A | * | 8/1999 | Westberg et al. ......... 370/395.3 |
| 6,289,016 B1 | * | 9/2001 | Subbiah et al. .......... 370/395.1 |
| 6,341,131 B1 | * | 1/2002 | Eneroth et al. ......... 370/395.61 |
| 6,434,151 B1 | * | 8/2002 | Caves et al. ............. 370/395.2 |
| 6,574,223 B1 | * | 6/2003 | Brueckheimer et al. . 370/395.6 |
| 6,597,697 B1 | * | 7/2003 | Petersen ..................... 370/474 |

FOREIGN PATENT DOCUMENTS

| | | |
|---|---|---|
| JP | 63-197148 | 8/1988 |
| JP | 4-157843 | 5/1992 |
| JP | 5-103016 | 4/1993 |
| JP | 7-162437 | 6/1995 |
| JP | 7-202895 | 8/1995 |
| JP | 7-245628 | 9/1995 |
| JP | 7-336354 | 12/1995 |
| JP | 10-70557 | 3/1998 |
| JP | 10-173673 | 6/1998 |
| WO | 97/33406 | 9/1997 |

* cited by examiner

Primary Examiner—Salvatore Cangialosi
(74) Attorney, Agent, or Firm—Katten Muchin Zavis Rosenman

(57) ABSTRACT

A multiplexing system in an ATM network is disclosed. The system produces low deviation in generation timing of a standard ATM cell and low transmission delay to realize high transmission efficiency. A cell multiplexing means is provided for assembling data received from a plurality of terminal lines into a short cell to be multiplexed into a standard ATM cell. A short cell is selected from a plurality of short cells to define a reference line. The short cell generation timing of the reference line is used as the reference timing to generate short cells for other lines so as to synchronize the generation timing. The short cells thus generated are then multiplexed into a standard ATM cell.

9 Claims, 13 Drawing Sheets

FIG. 4

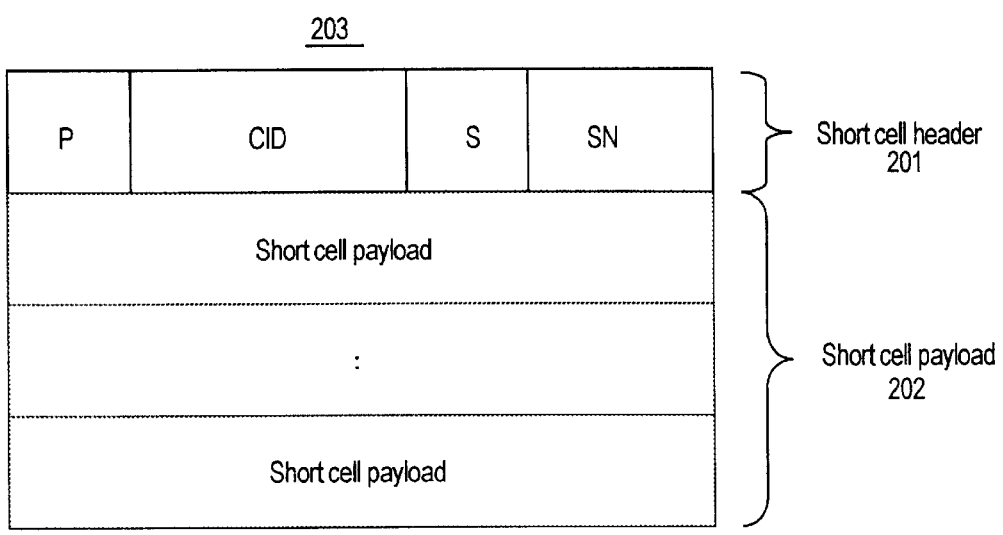

FIG. 5

| Field | Title | Meaning |
|---|---|---|
| P | Parity | Error detection information of short cell header |
| CID | Channel identifier | Identifier identifying which terminal data |
| S | Signaling line status information identifier | Identifier for transmitting local RS line to remote CD line |
| SN | Sequence number | Number of identifying a sequence of short cell |
| Short cell payload | Short cell payload | User data of terminal line |

CID: Channel identifier (8 bit)
LI: Length indication (6 bit)
UUI: User to User indication (5 bit)
CPS-INFO: Information (1-45/64 octet)

CELL MULTIPLEXING SYSTEM AND METHOD FOR AN ATM NETWORK

FIELD OF THE INVENTION

This invention relates to an ATM network and in particular multiplexing system for multiplexing cells with small delay.

BACKGROUND OF THE INVENTION

ATM (Asynchronous Transfer Mode) is expected as a communication technology for realizing multimedia services. Equipment using this technology has been developed for high-speed data communication including computer-to-computer communication.

In recent communication market, a network using ATM is desired which can interwork (communicate mutually) with communication protocols such as HDLC and Frame Relay as well as voice signals.

A standard ATM cell is transmitted using a fixed-length cell composed of 53 bytes, including a payload of 48 bytes. However, there is a problem that HDLC terminals connected to low speed lines of, for example, 1,200 bits per second (bps) to 9,600 bps which require short response time may not be handled properly when using the standard ATM cell.

In more detail, an example of delay time is calculated as follows.

When a payload of 48 bytes in a cell is fully packed by assembled data from a terminal having the speed of 2,400 bps, delay time=48/(1200/8)=0.32 second=320 milliseconds Therefore, time consumed from the transmission of data at a terminal to the reception of its response will be, 320×2+α=640+α≈700 milliseconds where, α is processing time consumed in the terminal.

This may exceed an acceptable response time for a HDLC terminal which is generally regarded as 300 milliseconds (ms) to 500 ms.

In order to shorten delay time produced in cell assembling, it may be possible to apply a method in which cell assembling is completed before the payload of 48 bytes is fully packed. According to this method, however, a large amount of dummy data has to be transmitted which results in reduced transmission efficiency.

Small delay transmission may also be attained using AAL2 which was recently discussed in the ATM Forum. In this method, however, there is also a problem of low transmission efficiency because a header having three bytes is specified in AAL2. Furthermore, a short packet used in AAL2 has variable length. This raises such problems as requiring complicated cell multiplexing process which requires to implement a large amount of mechanism to be implemented in the equipment.

On the other hand, there is a known technology that a plurality of short cells are multiplexed into a standard ATM cell after generating the short cell. In this method there is also a problem that a generation timing of a standard ATM cell may be drifted in case that short cell generation timings are different line by line.

SUMMARY OF THE INVENTION

It is an object of the present invention to provide a multiplexing equipment in an ATM network which attains to small delay and high transmission efficiency due to small deviation in the timing duration of standard ATM cell generation.

According to the present invention, a basic concept of multiplexing equipment in an ATM network to solve the aforementioned problems is to adjust a reception completion timing to be determined at the start of receiving processing on a terminal line in order to adjust a short cell generation timing.

Preferably, in the present invention, selection of a reference line to determine a receiving timing is performed in the following way.

When there exists no line which has already been in a receiving state, any line is selected as a reference line, on which receiving operation is performed at a timing predetermined to that line.

On the other hand, when there exists a line (or lines) which has already been in receiving state, it is checked whether a line (or lines) is in receiving operation under the same timing. If there exists a line which is in receiving operation under the same timing, the line is selected as a reference line. On the other hand, if there is no line having the same timing, a line having the latest timing is selected as a reference line.

Also, preferably it is checked with regard to a terminal line whether the amount of data which has already been received from the line is larger than that received from a reference line. If the received data is more than that of the reference line, the data already received is discarded, and interruption caused by data reception on the terminal line is made possible.

Furthermore, preferably the length of multiplexed effective data in a short cell is informed to equipment connected on the opposite side via a route other than that used for transmitting standard ATM cells.

In addition, preferably an effective data length per terminal is specified in advance and stored in ATM switching equipment, and is read out at the time when a line is activated for receiving data.

Further features and advantages of the present invention will be more apparent in the following embodiments explained with the reference of the following charts and diagrams.

BRIEF DESCRIPTION OF THE DRAWINGS

FIG. 4 shows a format of short cell 203.

FIG. 5 shows the explanation of each field in a short cell header 201.

DESCRIPTION OF THE PREFERRED EMBODIMENT

The present invention is described hereinafter referring to the charts and drawings, wherein like numerals or symbols refer to like parts.

In order to make easier understanding of the present invention, a general method will now be considered of mapping data received from a plurality of lines into a standard ATM cell, by which reduce delay time may be reduced and high transmission efficiency may be obtained.

Figure 1:
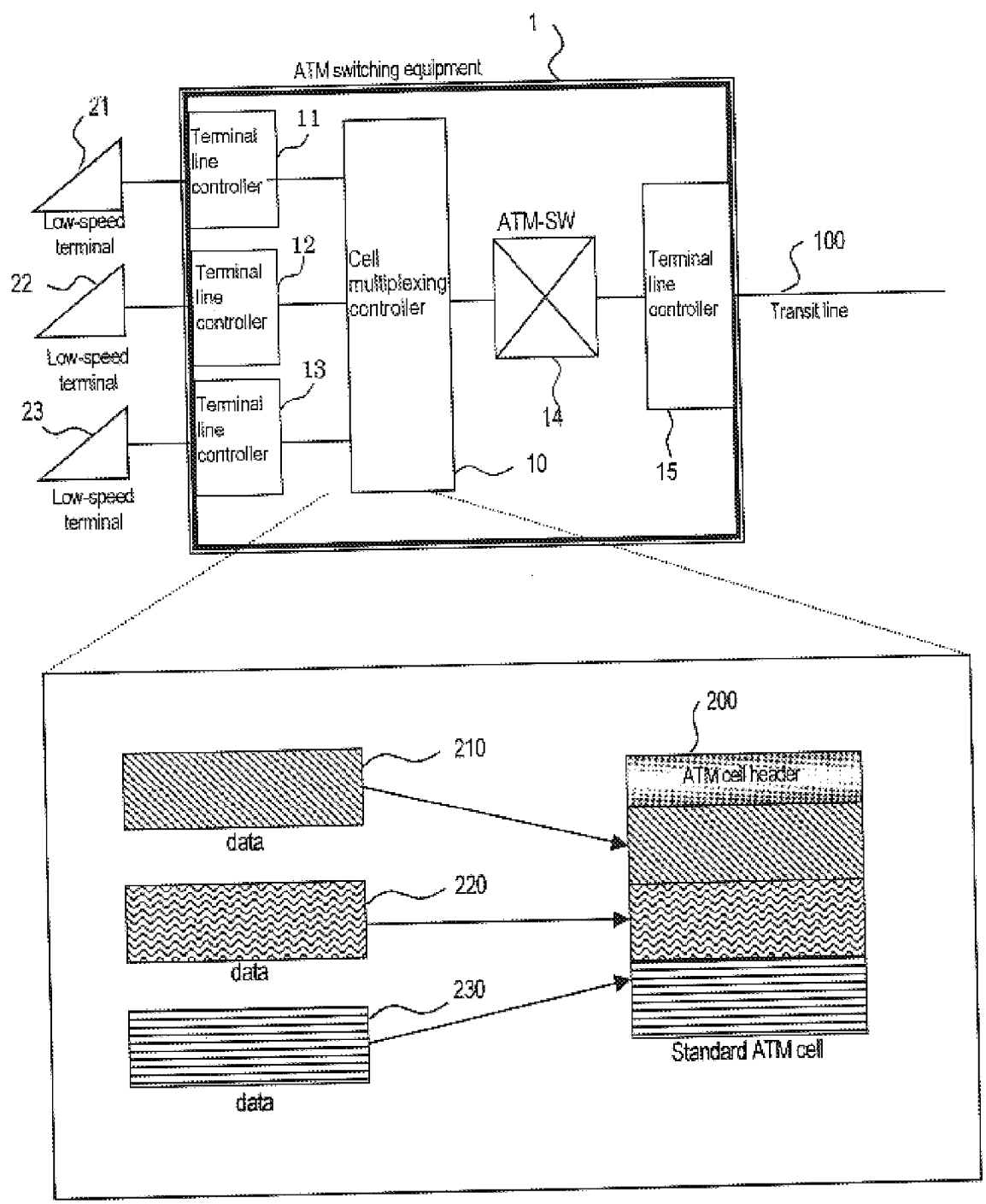
FIG. 1 shows a schematic block diagram of an ATM switching equipment to illustrate multiplexing control.

FIG. 1 shows a schematic block diagram of ATM switching equipment to explain multiplexing control. ATM switching equipment 1 includes line controllers 11 to 13 which accommodate a plurality of low-speed terminals 21 to 23, a cell multiplexing controller 10, an ATM switch 14 and a line controller 15 connected to a transit line 100.

In ATM switching equipment 1, data are mapped into standard ATM cells in the following way: Line data 210, 220 and 230 on a plurality of terminals 21, 22 and 23 are mapped into a standard ATM cell 200 by the cell multiplexing controller 10.

By mapping of multiplexed data 210, 220 and 230 of the plurality of terminals 21 to 23 into one standard ATM cell 200 the payload per terminal becomes smaller in length, to make shorter delay time for assembling into a cell.

In addition, because there is no dummy padding data in standard ATM cell 200, the bandwidth of transit line 100 may sufficiently be utilized to obtain efficient cell transmission.

Figure 2:
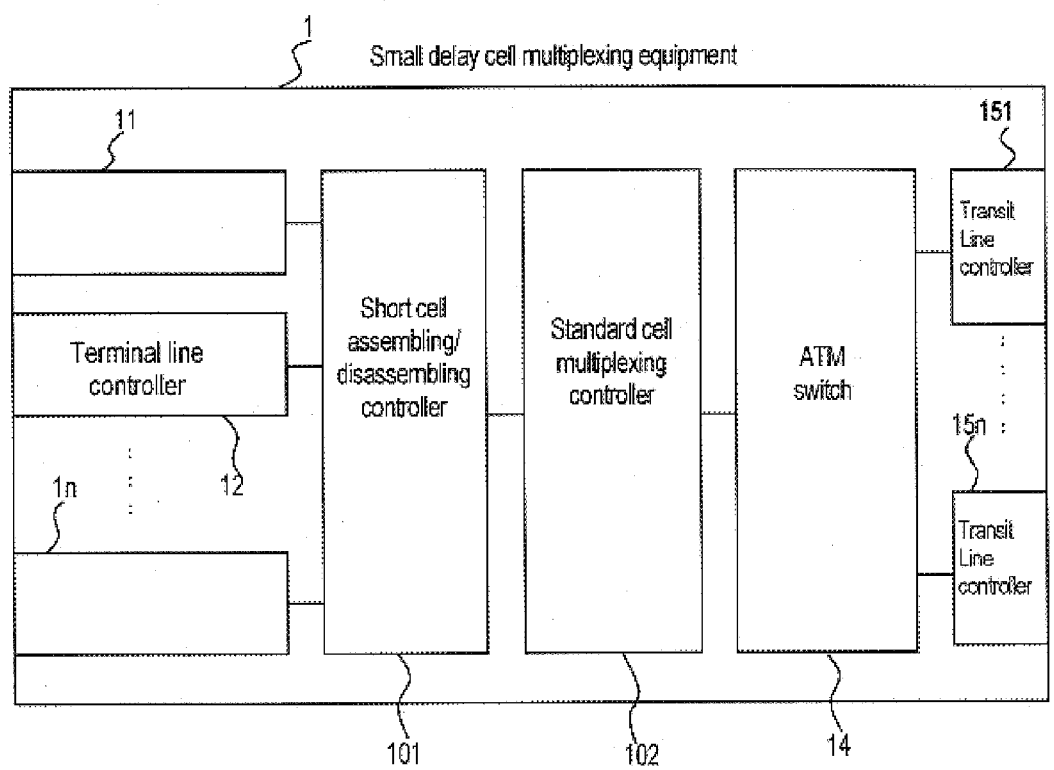
FIG. 2 shows a functional block diagram of a small delay cell multiplexing equipment 1.

Referring to FIG. 2, there is shown a functional block diagram of small delay cell multiplexing equipment 1. Small delay cell multiplexing equipment 1 includes terminal line controllers 11, 12, . . . 1n, a short cell assembling/disassembling controller 101, a standard cell multiplexing controller 102, a switch 14, and a transit line controller 151 to 15n.

Terminal line controllers 11, 12, . . . 1n have a function of controlling physical interface for accommodating terminal lines and control transmission and reception of data to/from the terminals.

Figure 3:
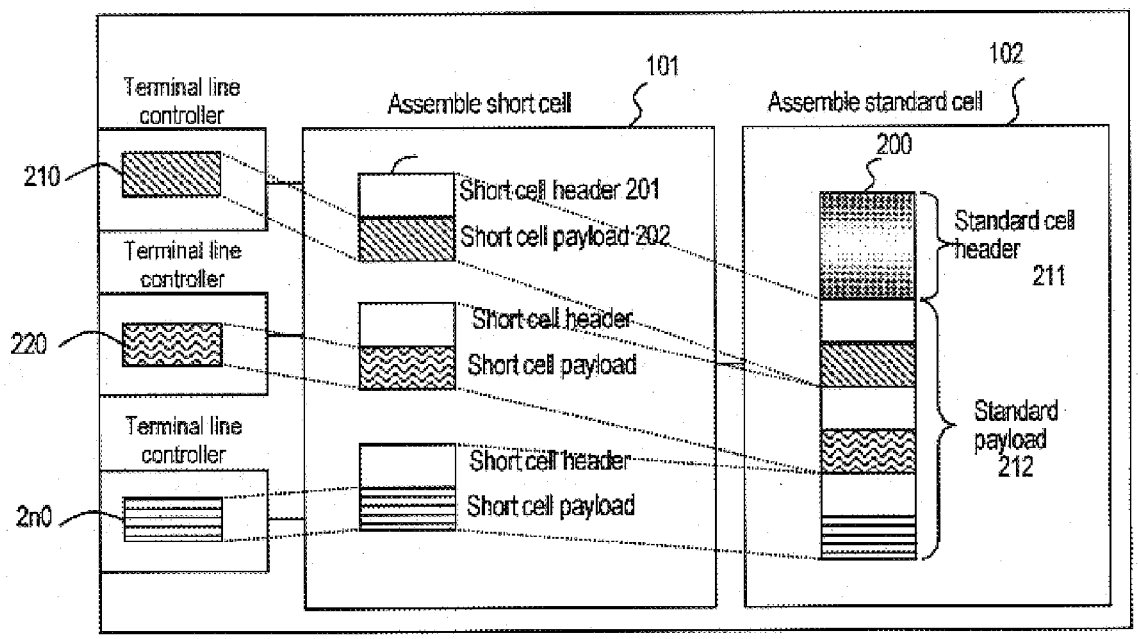
FIG. 3 shows detailed operation of a short cell assembling/disassembling controller 101.

FIG. 3 illustrates the detailed operation of a short cell assembling/disassembling controller 101. Short cell assembling/disassembling controller 101 makes data 210, 220, . . . 2n0 which have been received from terminal line controllers 11, 12, . . . 1n packed into payload 202, then attaches short cell header 201, to assemble into a short cell 203.

Furthermore, in standard cell multiplexing controller 102, short cell 203 is stored into payload 212 of standard cell 200, to which a standard cell header 211 is attached to constitute standard cell 200.

FIG. 4 shows a format of short cell 203. Here, short cell 203 is fixed in length. The reason of adopting fixed length is to make cell assembling and disassembling process simple and in high speed, as well as to obtain high transmission efficiency with a small amount of header information.

Short cell 203 is composed of a short cell header 201 and a short cell payload 202. Header 201 of short cell 203 has one byte in order to obtain higher transmission efficiency than that of AAL2.

Short cell header 201 is composed of P (parity), CID (channel identifier), S (signaling line status information identifier) and SN (sequence number).

Explanation on each part of short cell header 201 is shown in FIG. 5. P (parity) is error detection information of short cell header 201.

CID (channel identifier) is information to identify each terminal line in a standard cell in which data received from a plurality of terminal lines are multiplexed and transmitted. Equipment at receiving side identifies the terminal line using this CID.

S (signaling line status information identifier) is used for half duplex terminals to which carrier control is applied. The bit S indicates ON/OFF status of RS line signal of an incoming line to transfer the status through the ATM network and to control ON/OFF of an outgoing CD line.

SN (sequence number) is used for identifying a sequence number of short cell 203. Loss of short cell 203 either on a transmission line or in the ATM network can be detected at equipment connected to an outgoing line by checking the sequence number.

Figure 6:
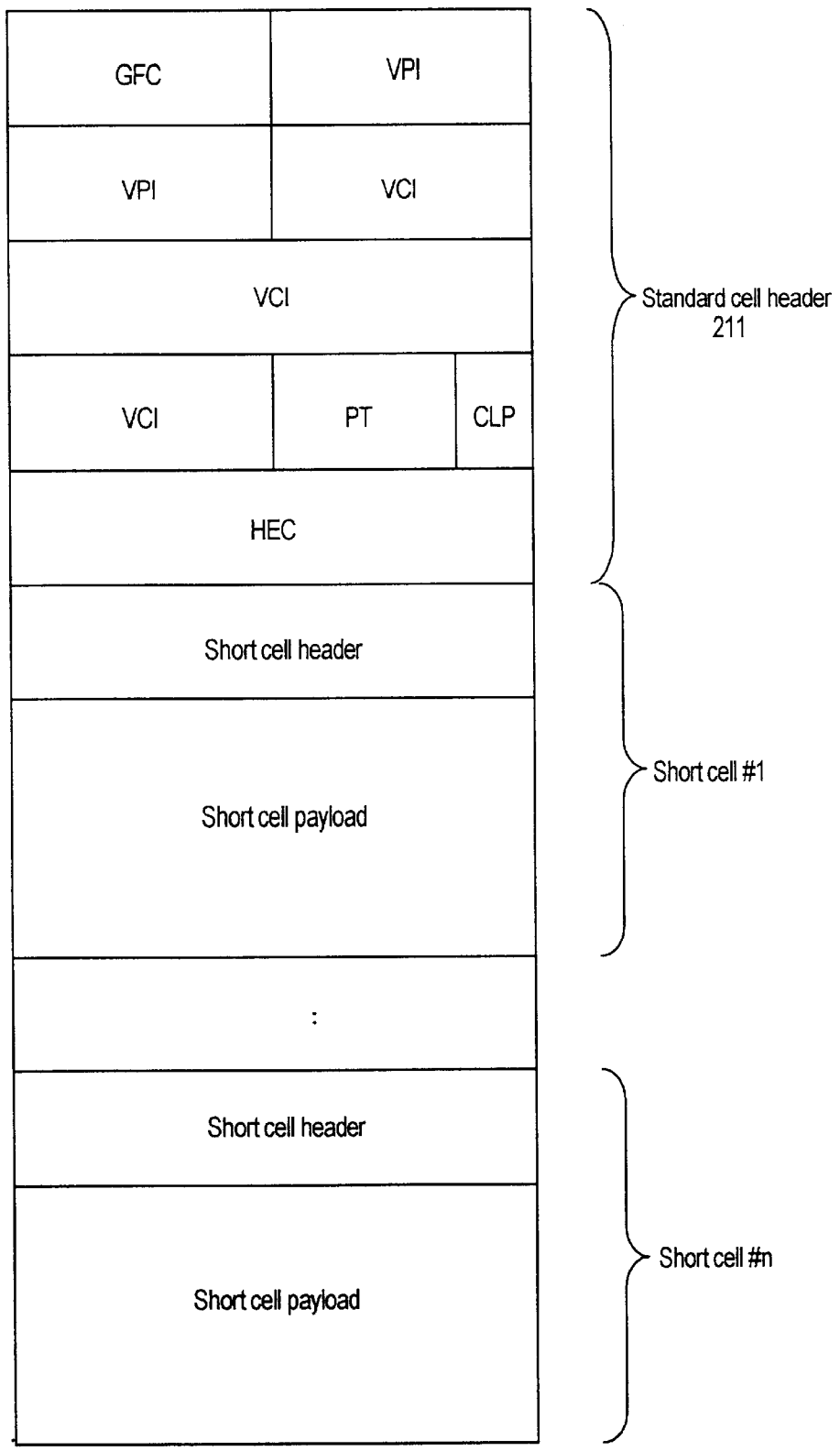
FIG. 6 shows a chart of multiplexing scheme to a standard ATM cell.

The number of short cells 203 to be mapped into a standard ATM cell can arbitrarily be specified. FIG. 6 shows a method of multiplexing into a standard ATM cell. Here, a number n of short cells 203 (#1 to #n) are multiplexed to be packed into a payload of standard ATM cell 200.

Figure 7:
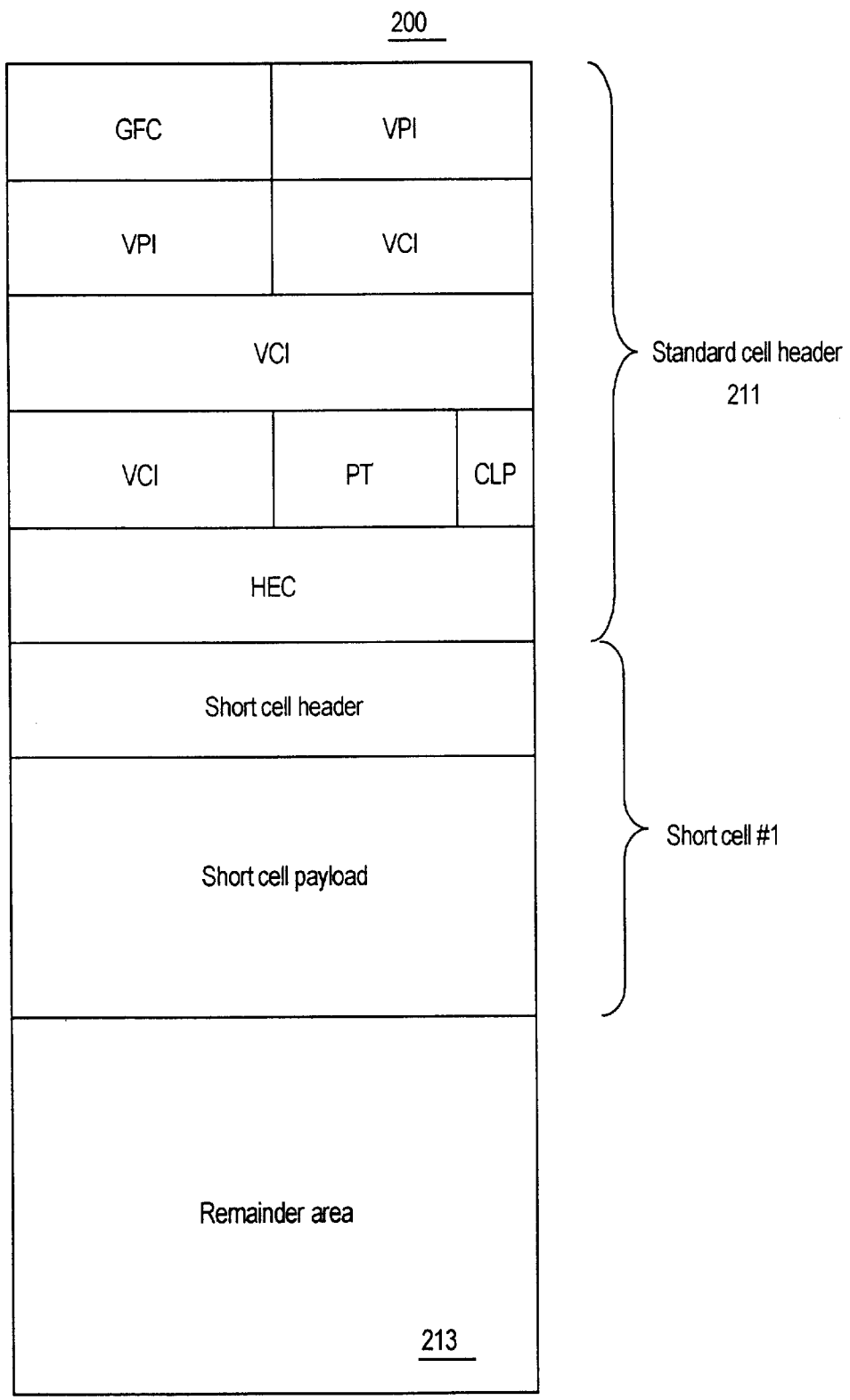
FIG. 7 shows an example of mapping data of only one terminal line into short cell #1 and padding dummy information in the remainder area of a standard ATM cell.

In the case data to be multiplexed into standard ATM cell 200 is being received from only one line, a problem of increased delay time for assembling into a cell will arise, if standard ATM cell 200 is to be filled up with multiplexed short cell 203. Accordingly, as shown in FIG. 7, it may also be possible to map into standard ATM cell 200 data only for one terminal line (short cell #1) and to pad idle information in remainder area 213.

Figure 8:
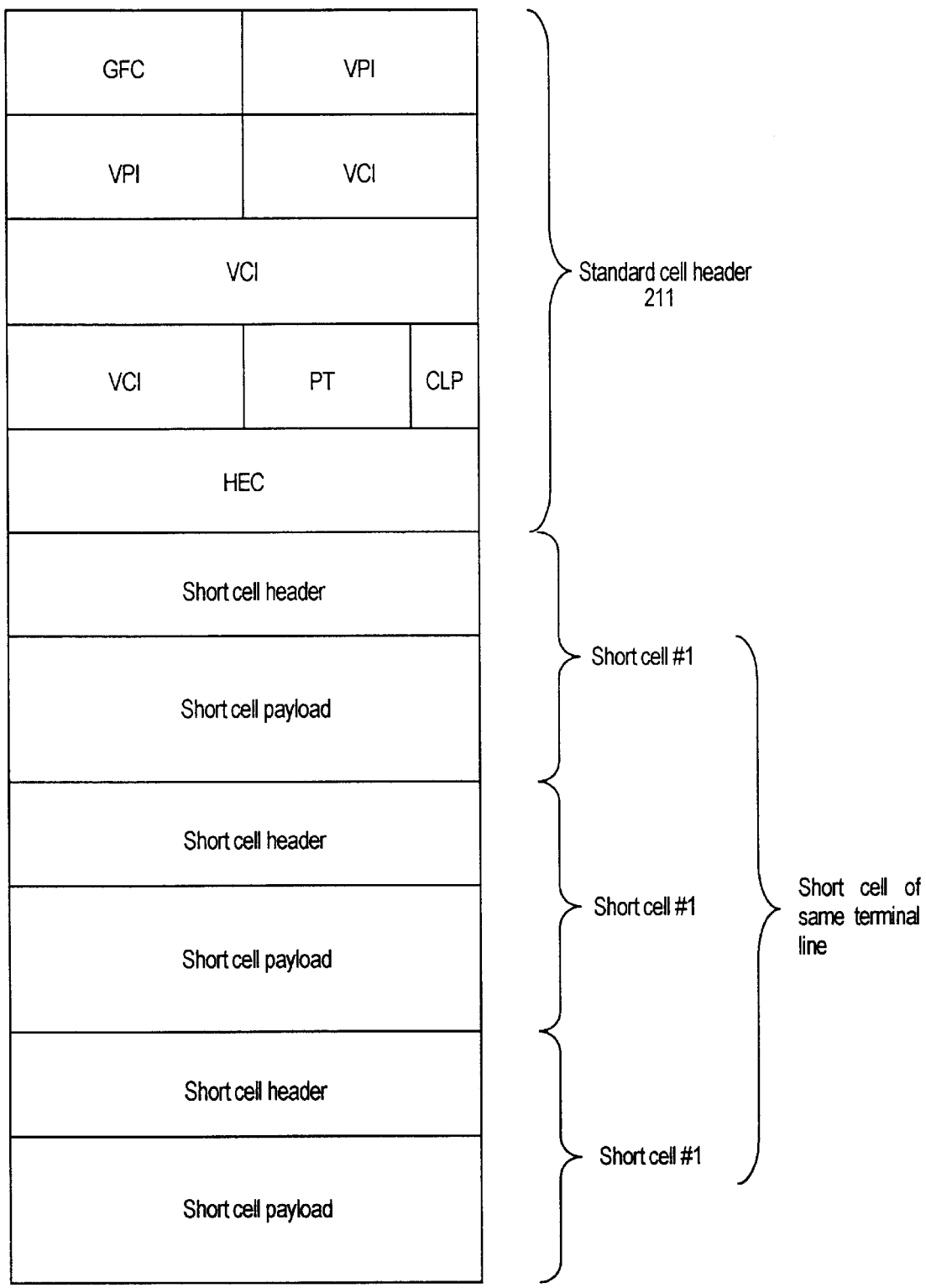
FIG. 8 shows a chart of multiplexing a plurality of short cells into a standard ATM cell.

In the case the efficiency of a transit line is considered more important than the delay time caused by cell assembly, it is also possible to apply a method of multiplexing a plurality of short cells received from one line into standard ATM cell 200. In FIG. 8, such a method is illustrated using an example of multiplexing three short cells.

Delay time caused by cell assembling is reciprocally proportional to the transit line efficiency. As explained above, an appropriate method of multiplexing short cells 203 into standard ATM cells 200 may be applied, considering various conditions such as network configuration, terminal condition, transit bandwidth and users' condition.

In the configuration example shown above, multiplexing into standard ATM cell 200 is performed using data from lines which are accommodated in only one terminal line package. If a larger number of line interfaces are housed in a terminal line package, it will raise a problem that the package, and also the equipment having the package, will become larger in size.

Figure 9:
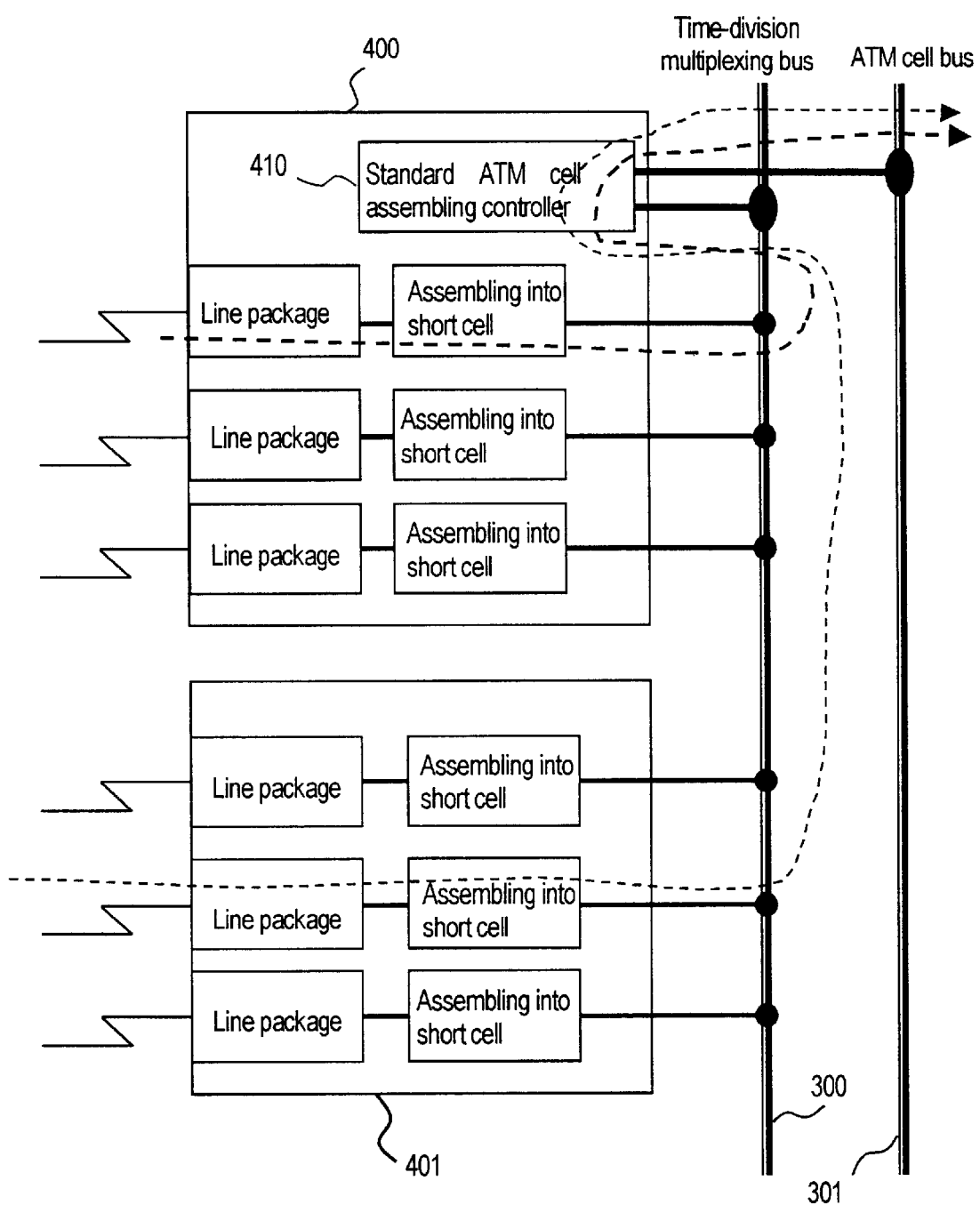
FIG. 9 shows a solution to prevent a terminal line package from becoming large because of a number of lines housed into the package.

In order to cope with this problem, the present invention provides, as shown in FIG. 9, two buses in the equipment: a time-division multiplexing bus 300; and an ATM cell bus 301. By connecting a plurality of terminal line packages 400 and 401 using time-division multiplexing bus 300, short cells 203 originated from different line packages can be multiplexed into one standard ATM cell 200.

Assembling into short cells is carried out in each of line terminal packages 400 and 401 and each assembled short cell is sent to time-division multiplexing bus 300. A package 400, in which standard ATM cell assembling controller 410 is housed, obtains short cells generated in the package 400 itself and other package (or packages) through time-division multiplexing bus 300, to multiplex into standard ATM cell 200.

It may also be possible to multiplex data received from a greater number of terminal lines than the maximum number of short cells which can be packed into one standard ATM cell 200. This is realized by installing a queuing function of a plurality of short cells in standard ATM cell assembling controller 410.

If the above-mentioned function is used, the delay time of the cells which are waiting in a queue of the equipment becomes greater. Using this function, however, the required number of ATM virtual channels (VC) can be reduced to one, thus enabling reduced VC resources.

The reduced number of VCs will be advantageous for users who want to subscribe services on which subscription contract is made based on the number of VCs, such as new ATM services provided by Nippon Telegraph and Telephone Corporation called "Shared link service" or "Super relay CR service".

In the first embodiment described above, a payload (information part for packing data) of a short cell has a fixed length. However, it is also possible to introduce variable payload length in a short cell, by which transmission delay can be reduced.

In more detail, by making terminal line data assembled at the unit of length smaller than the payload length in a short cell, the time required for assembling into a short cell can be reduced.

Figure 10:
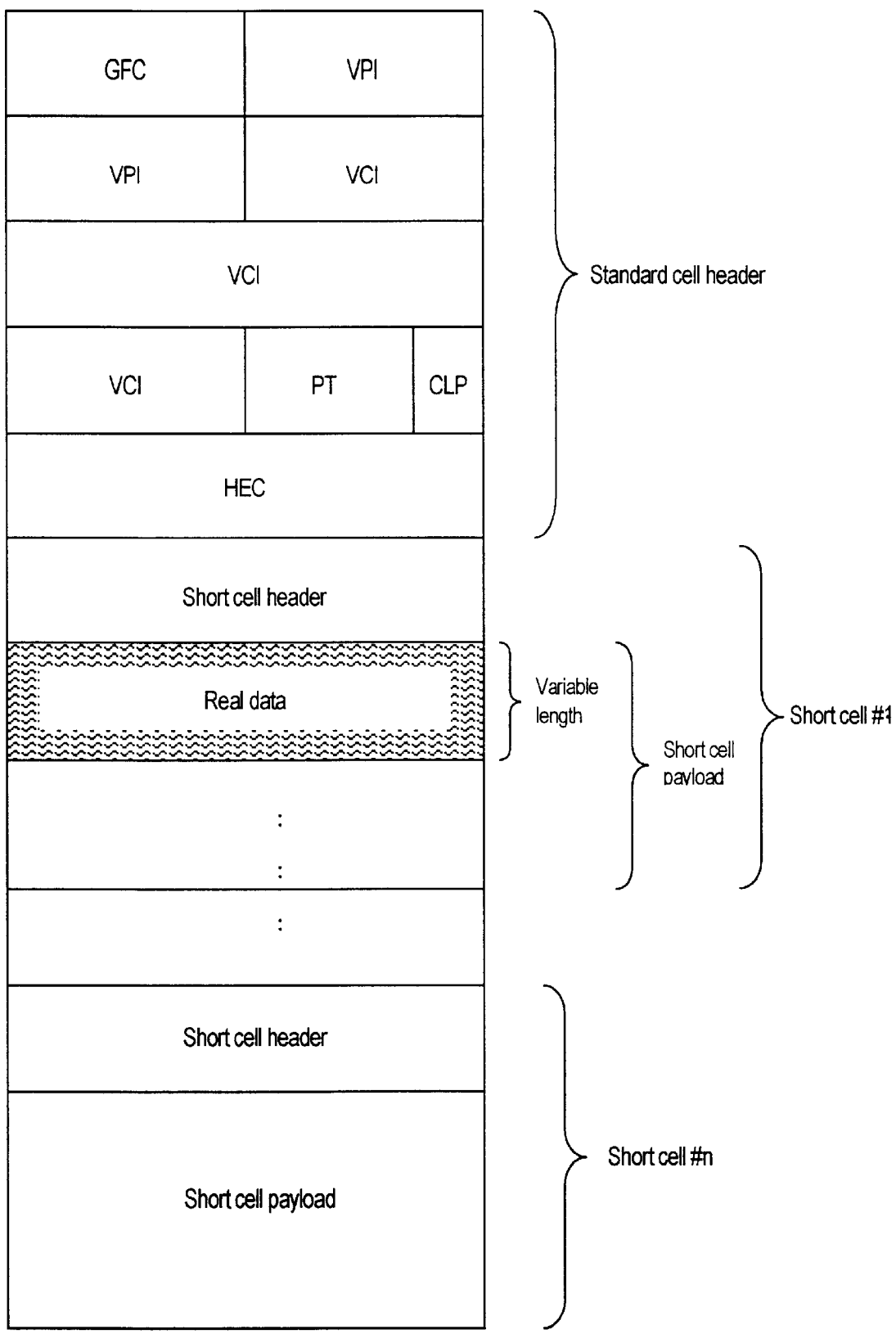
FIG. 10 shows a cell format of a short cell multiplexing scheme in which information part for containing real data is made variable in length.

Referring to FIG. 10, there is shown a cell format in which a scheme of variable length short cell multiplexing (i.e. variable length of information part for accommodating real data) is applied. In FIG. 10, the payload length for short cell #1 is set variable.

A timing control method in short cell multiplexing is described hereafter. It is supposed that a plurality of short cells SC1–SC3 are to be multiplexed into a standard ATM cell. In the case that the generation timing of short cells SC1–SC3 is different from each other, a standard ATM cell STDC is generated at the time of the completion of packing three short cells SC1–SC3, from the viewpoint of transmission efficiency as explained earlier.

Therefore the data in short cell SC1 is kept waiting for the time TD until short cell SC3 is generated. Therefore, the transmission delay of short cell SC1 becomes large. This transmission delay will become larger with the increase of terminal lines.

Providing that data are being received on a plurality of lines under the identical condition (i.e. the same terminal line speed and the same effective payload length in a short cell), delay time will vary line by line when cell generation timings are different from line to line. This causes a problem that a delay is increased which approximately reaches maximum to a time for one short cell generation on a certain line.

In order to solve in this invention the above-mentioned problem, the following control is carried out at the start of receiving terminal line data.

First, a reception completion timing on each terminal line is adjusted. At the time reception is completed on a reference terminal line, reception on other terminal lines which is to be multiplexed into the same VC is activated. That is, interruption of reception from other terminal lines is enabled.

Secondly, a short cell generation timing is adjusted. At the time of short cell generation on a reference terminal line, data which has been received larger in amount than that received on other line (or lines) is discarded, so as to make the received data the same in size as data being received from other lines.

Figure 11:
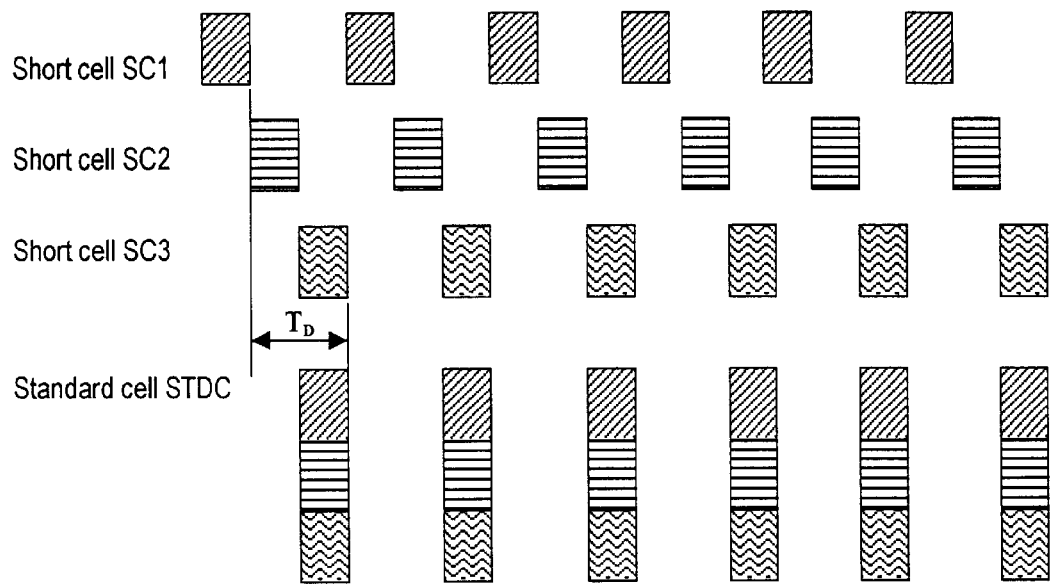
FIG. 11 shows a chart indicating a problem which may arise in case that a plurality of short cells are multiplexed into a standard cell.
Figure 12:
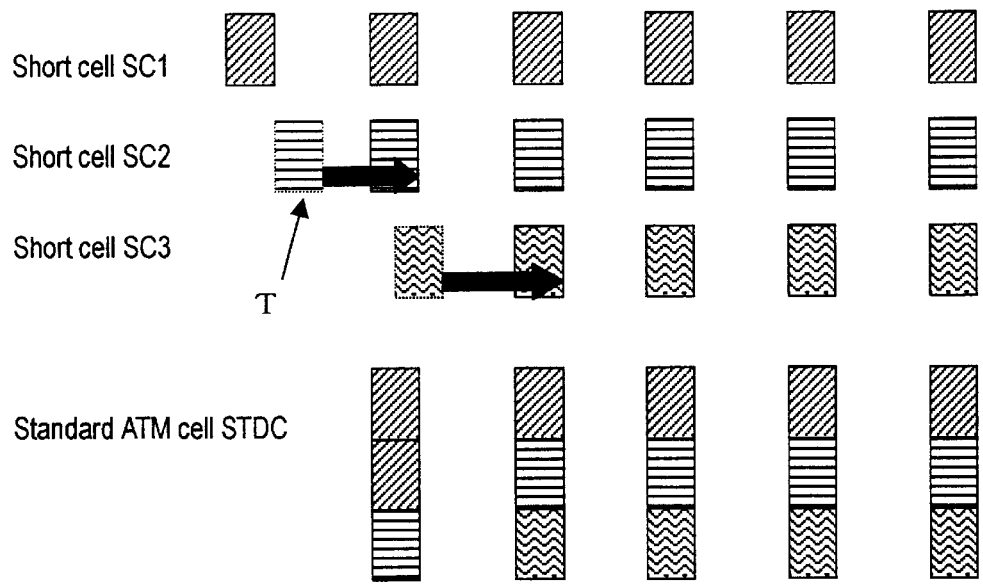
FIG. 12 shows an embodiment of the present invention to solve the problem shown in FIG. 11.

FIG. 12 illustrates the short cell generation timing in accordance with the present invention. In FIG. 12, there is shown a case that a short cell SC2 is newly added while a standard ATM cell STDC is being generated caused by short cell SC1 only. In the conventional method shown in FIG. 11, a short cell is generated at the timing of T.

As mentioned earlier, larger delay time will be produced in such a case of different short cell generation timing as shown above.

Therefore, according to the present invention, the generation timing for short cell SC2 is adjusted to the timing for generating short cell SC1, taking the generation timing of SC1 as a reference timing (as shown with an arrow in FIG. 12). The shifted data caused by the shift of timing shown with the arrow is discarded.

Using this method, subsequent generation timings for short cell SCI and short cell SC2 are synchronized, resulting in the transmission with small drift and short delay. The situation on short cell SC3 is identical to the above.

There has been shown the case that generation timing of short cells is the same for three lines (i.e. the same transmission speed). Even the line speed is different between lines, the control method as well as effect may be identical to the above.

In the aforementioned explanation, "a reference terminal line" taken as a reference for adjusting the short cell generation timing is aimed to obtain the same short cell generation timing for all terminal lines.

In the case that a terminal line having the same short cell generation timing has already been in receiving state, the terminal line goes on playing a role as a reference line. On the other hand, if a line which has already been in receiving state has a different speed, a terminal line having longer timing for short cell generation is selected as a reference line.

Here, the reason for selecting a line having long timing is to keep or maintain data in a short cell already generated. A line having longer interval of short cell generation timing (i.e. a lower terminal line speed) is more sensitive to delay. Furthermore, in the case of multiplexing terminals having different line speed, waiting time for processing lower speed terminal will become longer if timing for a low speed line is adjusted to the timing of higher speed line.

The short cell generation timing is obtained by the following formula.

short cell generation timing=(short cell payload×8 bit)/terminal line speed

Figure 13:
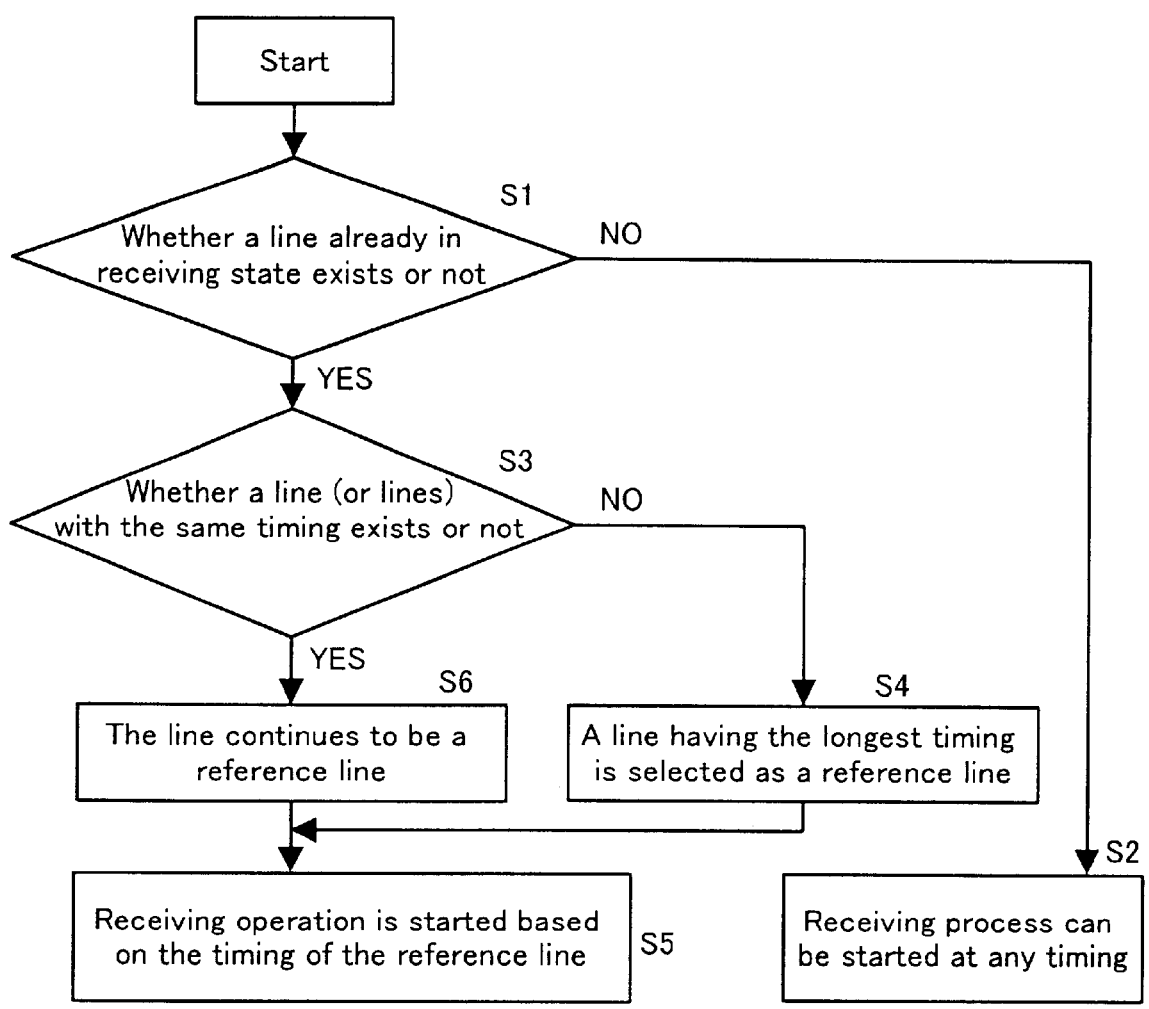
FIG. 13 shows a logic flow for selecting a reference terminal line.

A logic flow for the selection of a reference terminal line described above is shown in FIG. 13. In FIG. 13, a process is started with checking whether a line already in receiving state exists or not (step S1). In the case there is no line in receiving state, receiving process can be started at any timing (step S2).

In the case there exists a line or lines already in receiving state, it is checked whether a line (or lines) with the same timing exists or not (step S3). If such a line does not exist, a line having the longest timing is selected as a reference line (step S4), and receiving operation is started based on the timing of the reference line (step S5).

On the other hand, in step S3, if a line of the same timing exists, the line continues to be a reference line (step S6), and receiving operation for the new line is started based on the timing of the reference line (step S5).

Figure 14:
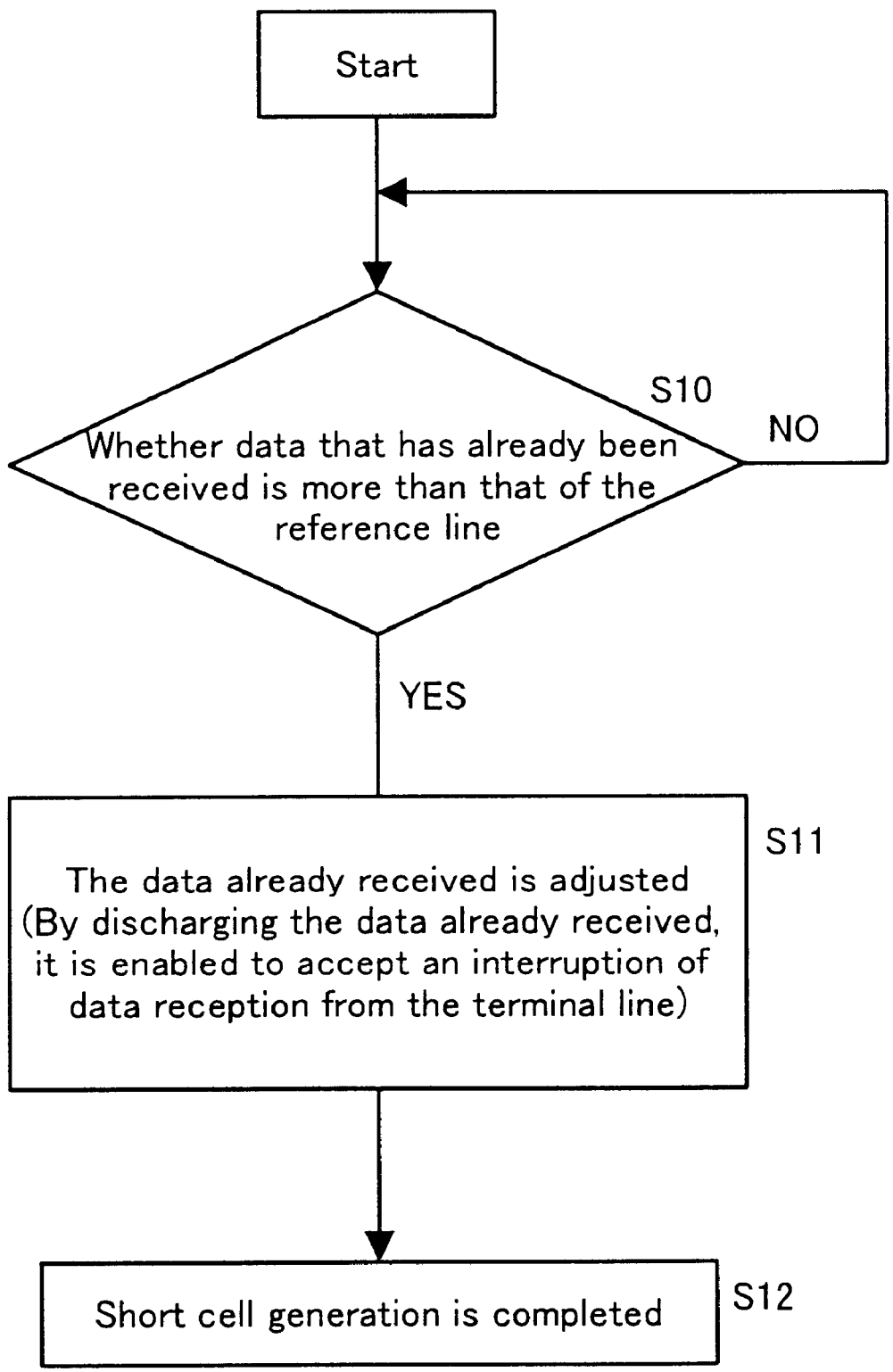
FIG. 14 shows a logic flow for adjusting short cell generation timing.

Referring to FIG. 14, there is shown a logic flow for adjusting the short cell generation timing. In FIG. 14, a process is started with checking whether data that has already been received is more than that of the reference line (step S10).

In the case that the data already received is more than that of the reference line, the data already received is adjusted (step S11) by discarding. By this, it is enabled to accept an interruption of data reception from the terminal line. Then, short cell generation is completed (step S12).

Now, the following outlines AAL2 (ATM Adaptation Layer 2), which is being provided by the ATM Forum and specifies a method for transmission of short cells multiplexed into a standard ATM cell.

A main object of standardizing AAL2 is to transfer voice signals to which compression coding of less than 64 kb/s is applied. The background of this standardization is that necessity has intensively arisen to apply ATM technology in a cellular mobile communication system especially to the transmission between a base station and a switching system (which is called 'mobile trunking' in the ATM Forum). This was commonly recognized in Japan, the United States of America and the European countries.

There exists a problem that a time required for assembling into an ATM cell becomes long if conventional AAL and the like are used. An object of AAL2 is, therefore, to solve the above problem. The standardization activity had been carried out in cooperation with the ATM Forum and ITU-T. At the meeting of ITU-TSG13 in February 1997, a specification on basic part was agreed and was decided to adopt as ITU-T Recommendation I.363.

The concept and requirements toward standardization of AAL2 is as follows: (a) to have a short and variable-length payload, and (b) to multiplex information on a plurality of users into a cell.

The above (a) aims to cope with voice packets having a variety of lengths resulting from different compression coding schemes, while the above (b) aims to shorten delay time caused by cell assembling and also to increase line occupancy.

Figure 15:
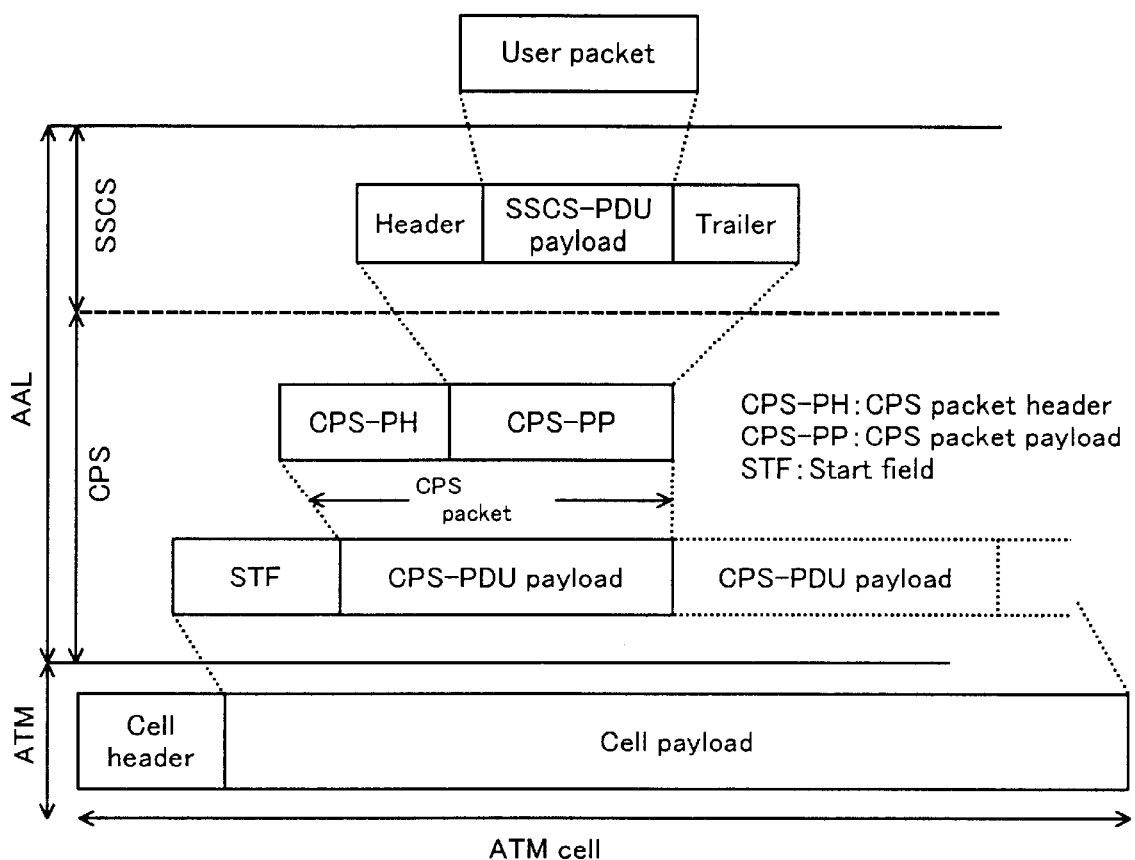
FIG. 15 shows a format specified in AAL2.

In the format of AAL2 shown in FIG. 15, a header is composed of 3 octets (or bytes), including 6 bits for indicating a data length.

Figure 16:
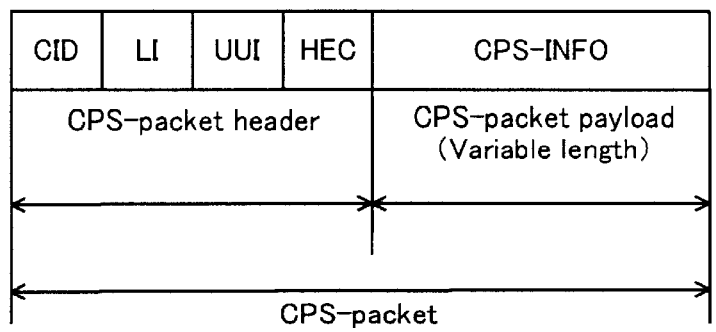
FIG. 16 shows a format of a short cell to be multiplexed in a payload part of the AAL2 format.

FIG. 16 shows the format of a short cell which is to be multiplexed into a payload part in the AAL2 format. In the case that the effective data length (the length of CPS-INFO) is short, there are unused bits left in the 3-octet header, resulting in substantial decrease of the transmission efficiency.

That is, in the case of cell multiplexing using a short cell scheme, higher transmission efficiency may be obtained when smaller short-cell headers are used.

Therefore, in the present invention, the effective data length of a short cell is not included in the header. Instead, information of the effective data length is transmitted to the equipment connected on the opposite side via another route. This enables, as a feature of the invention, the length of the short cell header composed of only one byte, and increased transmission efficiency is obtained.

An embodiment of the present invention is explained hereafter, wherein the effective data length of a short cell is transferred to equipment connected on the opposite side using a route which differs from that used for transferring ATM cells.

Figure 17:
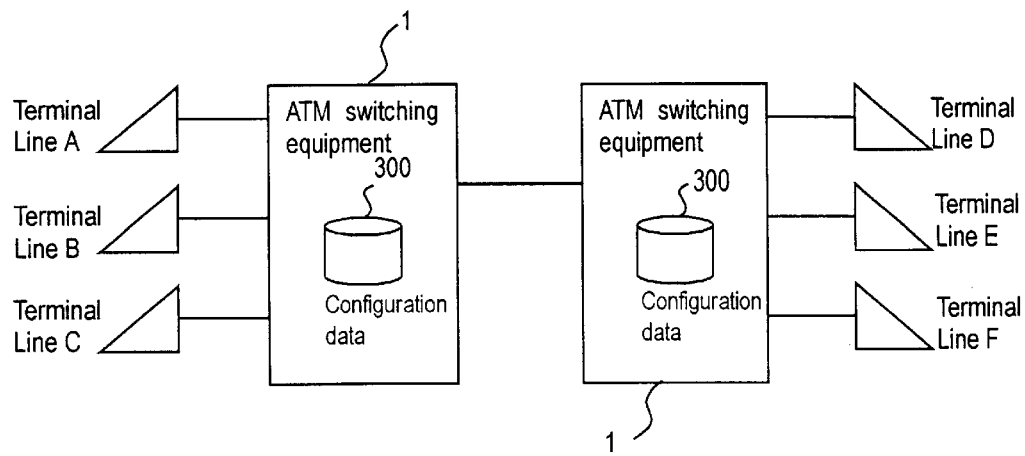
FIG. 17 shows a block diagram of a method for registering configuration data in advance.

FIG. 17 shows a block diagram illustrating a method for registering configuration data to be prepared in advance. Effective data lengths corresponding to terminal lines A to C, and also D to F, are specified in configuration databases 300 in ATM switching equipment 1 and 2 respectively. When data communication is required, ATM switching equipment 1 and 2 obtain effective data lengths from these configuration databases 300 then perform data communication.

In more detail, effective data lengths of terminals A/B/C and terminals D/E/F are registered in advance in database 100. When a line is to be activated, an effective data length corresponding to the relevant terminal is read out.

Accordingly, communication between switching equipment becomes possible without adding the effective data length to a short cell header. Thus, by fixing the length of a short cell header to one byte, transmission efficiency can be improved.

In another embodiment of the present invention, communication connection is established by using signaling before starting communication between terminals. According to this method, using a signaling message, the effective data length is informed to the equipment connected on the opposite side. Thus, communication between switching equipment is possible without adding data length information in a short cell header. This also enables to fix the length of a short cell header to one byte to improve transmission efficiency.

Figure 18:
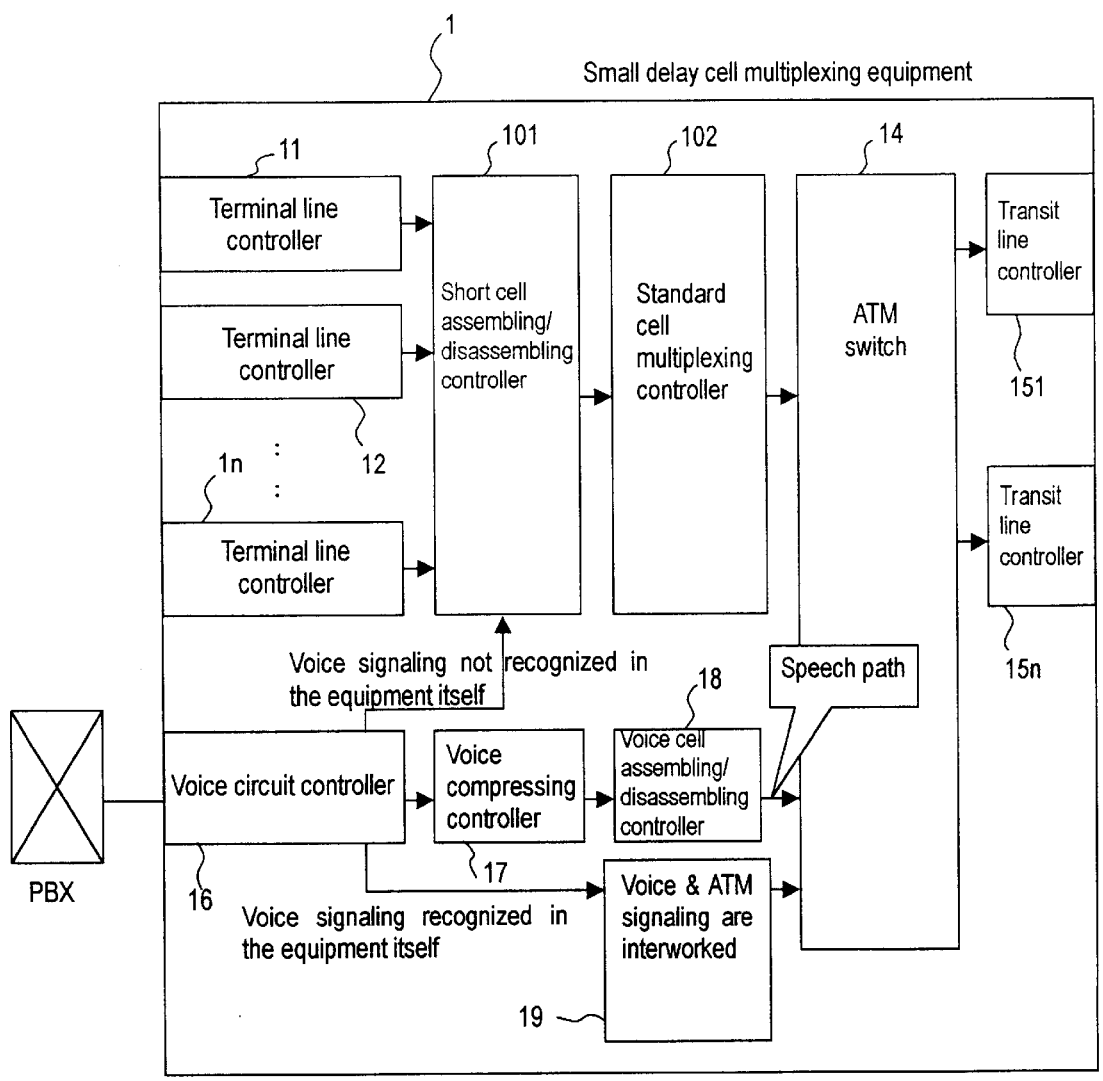
FIG. 18 shows a configuration diagram of ATM switching equipment 1 in accordance with another embodiment of the invention.

Referring to FIG. 18, there is shown a block diagram of the configuration of ATM switching equipment 1 in accordance with another embodiment of the present invention. As compared with the configuration shown in FIG. 2, a voice circuit controller 16 which is connected to a PBX is provided. Software is implemented in voice circuit controller 16.

In voice circuit controller 16, the software analyzes voice signaling and a destination information in the case signaling can be identified in the equipment itself. Then, a signal is transmitted to ATM switching equipment corresponding to the analyzed destination information.

In this case, voice and ATM signaling are interworked in a controller 19. SVC (switched virtual call) communication is realized using the above-mentioned control method.

Using this control, however, communication is possible only in the case that the signaling can be recognized in the equipment. If the above recognition is not possible, the signaling can not be transmitted transparently.

In order to cope with the above problem, the following method is provided in the present invention. If the signaling can not be recognized in the equipment by software implemented in voice circuit controller 16, a fixed speech path is set in advance using PVC (permanent virtual call). A cell is assembled with a small delay in short cell assembling/disassembling controller 101. Transparent transmission can be attained using the above-mentioned method, under a restriction that the destination party is fixed.

Having been explained referring to charts and diagrams, the effect of the present invention can be summarized as follows:

(1) High efficient ATM cell transmission capability with small delay can be realized.

(2) A plurality of lines can be multiplexed into one virtual circuit, which brings about reduced cost when accommodating lines to an ATM service network.

The foregoing description of a preferred embodiment is intended for the comprehension of the invention. It is not desired to limit the invention to the particular details of the examples illustrated. It is intended by the appended claims to cover all features and advantages of the invention which fall within the scope of the invention, and accordingly all suitable modifications and equivalents may be resorted to, falling within the scope of the invention.

What is claimed is:

1. A cell multiplexing method for multiplexing short cells into a standard ATM cell, said short cells being generated by assembling data received from a plurality of terminal lines, the method comprising the steps of:

defining a short cell from a plurality of short cells as a reference line generating short cells for other lines using a short cell generation timing of said reference line as a reference timing; and, multiplexing said short cells thus generated into a standard ATM cell.

2. The method according to claim 1, wherein the step of defining the short cell as reference line includes the steps of;

deciding whether a line or lines having been in receiving state exists;

in the case no lines exist having been in receiving state, determining a line having any timing as a reference line;

in the case a line having been in receiving state exists, further deciding whether a line having the same receiving timing exists;

in the case a line having the same timing exists, determining said line as a reference line; and, in the case any line having the same timing does not exist, determining a line having the longest timing as a reference line.

3. The method according to claim 1, further comprising the steps of;

deciding whether the amount of data having been received from a terminal line is larger than received data from a reference line; and, in the case the received data from said terminal line is larger than that from the reference line, discarding said received data to enable an interruption of data reception from said terminal line.

4. The method according to claim 1, wherein effective data lengths of said multiplexed short cells are informed to equipment connected on the opposite side using other route than that used for transmitting the standard cell.

5. The method according to claim 4, wherein each predetermined effective data length for each terminal is stored in ATM switching equipment, said effective data length for a terminal being read out at the time of activating a line corresponding to said terminal.

6. A cell multiplexing system which multiplexes short cells into a standard ATM cell, said short cells being generated by assembling data received from a plurality of terminal lines, said system comprising:

a plurality of terminal line packages each accommodating a terminal line and assembling data received on the terminal line into a short cell;

a time-division multiplexing bus for transmitting a plurality of short cells, each being assembled by a corresponding terminal line package, in time division;

an ATM cell bus for transmitting an ATM cell; and a standard cell assembling controller provided in either one of said plurality of terminal line packages, for multiplexing the plurality of short cells assembled by the terminal line packages, as making a terminal line package in which the standard cell assembling controller is provided as a reference line, and transmitting the multiplexed short cells into the ATM cell bus.

7. The system according to claim 6, wherein a payload of said short cell is variable in length to adjust cell assembling delay.

8. The system according to claim 6, further comprising information transfer means for transferring the effective data length of each multiplexed short cell to equipment connected on the opposite side, by means of a route different from a route used for the standard ATM cell.

9. The system according to claim 8, further comprising a database to specify the effective data length of short cells, said data length for a terminal being read out at the time a line corresponding to said terminal is activated for data reception.

* * * * *